United States Patent [19]
Nishigaki et al.

[11] Patent Number: 5,130,741
[45] Date of Patent: Jul. 14, 1992

[54] VIDEO CAMERA HAVING DC POWER SOURCE LIGHT

[75] Inventors: Jiro Nishigaki; Takeshi Kawarai, both of Ibaraki; Seiko Nakasuna, Katsuta; Yuichi Kosukegawa, Hino; Kazuyoshi Yamada; Yuuhei Abe, both of Katsuta, all of Japan

[73] Assignee: Hitachi, Ltd., Tokyo, Japan

[21] Appl. No.: 544,509

[22] Filed: Jun. 27, 1990

[30] Foreign Application Priority Data

Jul. 3, 1989 [JP] Japan .................. 1-169978

[51] Int. Cl.$^5$ .............................................. G03B 15/05
[52] U.S. Cl. .................. 354/484; 354/127.1; 354/145.1
[58] Field of Search .............. 354/126, 127.1, 127.11, 354/127.12, 468, 484, 145.1, 129; 358/906, 909, 229

[56] References Cited

U.S. PATENT DOCUMENTS

| | | | |
|---|---|---|---|
| Re. 32,177 | 6/1986 | Hashimoto et al. | 354/126 |
| 3,712,197 | 1/1973 | Wagner | 354/145.1 X |
| 3,810,212 | 5/1974 | Biber | 354/127.1 |
| 4,201,463 | 5/1980 | Harigoya et al. | 354/145.1 X |
| 4,249,813 | 2/1981 | Nihei | 354/145.1 X |
| 4,860,113 | 8/1989 | Miyamoto et al. | 358/909 X |
| 4,924,246 | 5/1990 | Yamada et al. | 354/126 |
| 5,006,881 | 4/1991 | Kodama | 354/484 |
| 5,027,150 | 6/1991 | Inoue et al. | 354/484 |

Primary Examiner—W. B. Perkey
Attorney, Agent, or Firm—Antonelli, Terry, Stout & Kraus

[57] ABSTRACT

A DC power source light which is mountable to and dismountable from a camera body of a video camera is supplied with power from a battery provided in said camera body so that said DC power source light is made compact and light in weight. Further, either said camera body or said DC power source light has a unit for preventing excess discharge of said battery and a unit for preventing excess current when the switch is turned on, thereby to protect said battery.

11 Claims, 5 Drawing Sheets

VIDEO CAMERA HAVING DC POWER SOURCE LIGHT

BACKGROUND OF THE INVENTION

The present invention relates to a video camera such as a VTR integrated camera to and from which a DC power source light is mountable and dismountable respectively for illuminating an object of which image is to be picked up.

When an image of an object is to be picked up at night or in an environment of darkness where there is no sufficient brightness, an illumination unit is used to illuminate the object to acquire sufficient brightness. As an illumination unit to be used for a video camera, a DC power source light which is mountable and dismountable to and from the video camera is known. An exclusive battery pack is mountably and dismountable incorporated in the DC power source light. When a switch of the DC power source light is turned on, the DC power source light emits light to illuminate an object.

Such a conventional DC power source light, however, has a problem that since an exclusive battery is incorporated in the DC power source light, the light itself becomes large and very heavy, so that when this is loaded on a video camera to pick up images, the video camera as a whole becomes large and very heavy which is difficult to handle.

Further, in the above-described conventional DC power source light, no consideration is given to the case where the capacity of the battery becomes small.

For example, in the case where a camera user has forgotten to turn off the switch of the light to disconnect the light from the power source after he or she used the DC power source light to emit light for a prescribed illumination time, there is a possibility that the battery continues discharging until its capacity has been completely wasted. A battery currently available in the market comprises a plurality of cells, and when a discharging continues as described above an imbalance may occur in the state of changing to cells of the battery. When the magnitude of this imbalance becomes large to cause large differences of voltages among the cells, an output voltage of a cell having a high voltage is forcibly applied to a cell of a lower voltage at its both terminals. If such a state lasts, the battery is deteriorated. For example, in the case where a nickel cadmium battery is used as a battery, when an output voltage of a certain cell is applied to another cell because of an imbalance of the state of changing to the cells as described above, hydrogen may be generated in the battery to deteriorate the battery which may incur a dangerous state. This problem will similarly occur in the case where a plurality of batteries are used in parallel, as well.

Further, in the above-described conventional DC power source light, no consideration is given to excess current which occurs at a point of time when the power source is connected by turning on the switch.

In other words, the resistance temperature characteristics of the filament of a lamp fitted to a DC power source light is set such that when the filament temperature is high, the filament resistance takes a value to maintain the filament current at a rated value, but when the filament temperature is low, the filament resistance becomes close to zero. Therefore, at the moment when the switch is turned on to connect the power source, the filament resistance takes a value close to zero because the filament temperature is low at that time, so that a current which exceeds a rated reference value flows to the filament, and accordingly, to the battery. As a result, the life of the battery is lost and a power source noise is mixed into other portions of the video camera.

SUMMARY OF THE INVENTION

It is an object of the present invention to provide a video camera which eliminates the above-described drawbacks and which realizes a compact and light-weight DC power source light.

It is another object of the present invention to provide a video camera which can prevent the battery from being deteriorated due to mounting of a DC power source light to the video camera.

It is a further object of the present invention to provide a video camera which can prevent excess current from being flown to the battery at a moment when power source voltage is applied to the DC power source light.

In order to achieve the above objects, according t the present invention, power source terminals are provided for applying a power source voltage to the DC power source light, and power source terminals connected to a battery, which is incorporated in a camera body, are provided in the camera body so that the DC power source light can be mounted to the camera body and the power source terminals are mutually brought into contact with each other when light is mounted on the camera body.

Further, according to the present invention, a battery excess discharge prevention unit is provided which detects excess discharge of the battery when the DC power source light is mounted to the camera body and prohibits application of power source voltage to the DC power source light if excess voltage has been detected.

Further, according to the present invention, an excess current prevention unit is provided which sufficiently reduces to a value smaller than a rated value a current that flows to an illumination unit of the DC power source light for a predetermined time after the power source switch of the DC power source light has been turned on and which sets the current to the rated value after this predetermined time.

When the DC power source light is mounted to the camera body, the power source terminals of the DC power source light are automatically connected to the power source terminals of the camera body, to enable an illumination light of the DC power source light to be emitted by using the battery of the camera body. Accordingly, it is not necessary to provide an exclusive battery in the DC power source light so that the DC power source light can be made compact and light in weight. Further, since it becomes possible to automatically supply current of a power source voltage to the DC power source light by merely mounting the DC power source light to the camera body, a work for electrically connecting the DC power source light with the camera body becomes unnecessary, so that a preparatory work required for the use of the DC power source light becomes simple.

When the DC power source light is left with the light on, the battery continues discharging and when the battery becomes an excess discharge state the excess discharge prevention unit detects this state and interrupts supply of a current to the illumination unit of the DC power source light. Thus, it becomes possible to avoid such a situation that the charges among the cells are unbalanced in the battery. As a result, it becomes possible to prevent the battery from being deteriorated.

Further, because of the function of the excess current prevention unit, it is possible to sufficiently reduce current which flows to the illumination unit during a predetermined time after current of a power source voltage is supplied to the DC power source light. Therefore, it is possible to prevent excess current which is generated in the illumination unit during this current-supply starting period, thereby to prevent damaging of the life of the battery or generation of power source noises.

DESCRIPTION OF THE PREFERRED EMBODIMENTS

Embodiments of the present invention will be explained below with reference to the drawings.

Figure 1A:
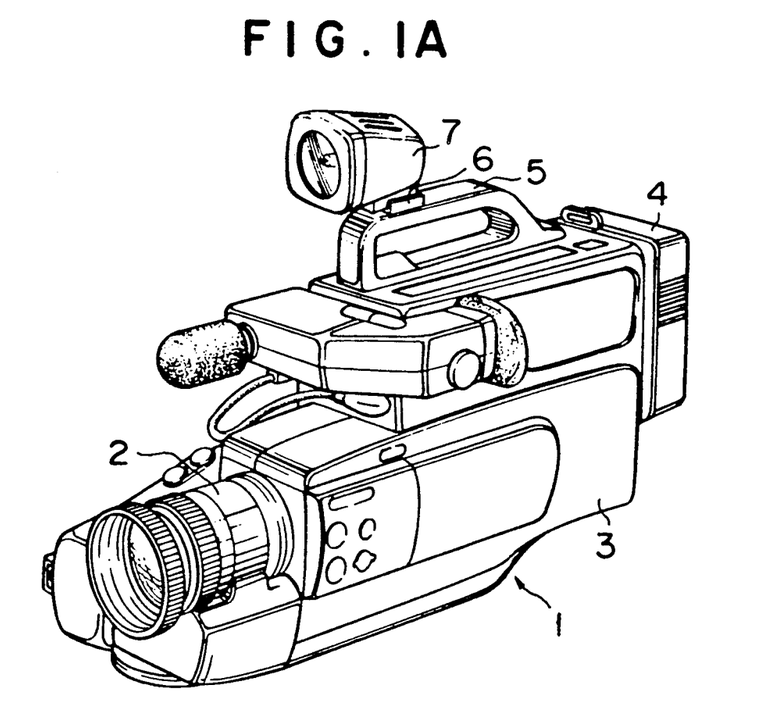
FIG. 1A is a drawing showing the state that a DC power source light is mounted to a VTR integrated camera in one embodiment of the present invention.
Figure 1B:
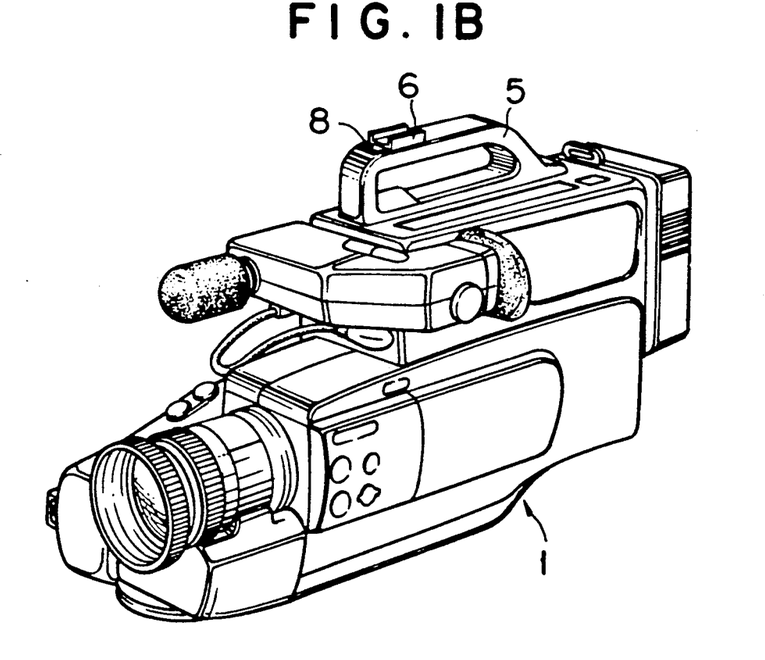
FIG. 1B is a drawing showing the state that the DC power source light is dismounted from the VTR integrated camera shown in FIG. 1A.

FIG. 1 is a perspective view showing one example of the video camera according to the present invention, based on a VTR integrated camera as an example, where FIG. 1A shows the state that the DC power source light is mounted and FIG. 1B shows the state that the DC power source light is dismounted. In FIG. 1, 1 designates a camera body, 2 a camera section, 3 a VTR section, 4 a battery, 5 a handle, 6 an accessory shoe, 7 a DC power source light, and 8 an accommodation section for power source terminals.

In FIG. 1, the camera body 1 has an integration of the camera section 2 for picking up images of an object and the VTR section 3 for recording and reproducing an output video signal of the camera section 2. At the rear surface portion of the camera body 1, the battery 4 is mountably and dismountably disposed to provide a common power source for the camera section 2 and the VTR section 3.

On the top surface portion of the camera body 1, the handle 5 is disposed for carrying this VTR integrated camera, and the accessory shoe 6 is provided on this handle 5. The DC power source light 7 can be fitted to the accessory shoe 6 as shown in FIG. 1A so that the DC power source light 7 is mountable and dismountable on the camera body 1.

Near the accessory shoe 6 on the handle 5, the accommodation section is located to accommodate power source terminals to which a power source voltage is supplied from the battery 4. When the DC power source light 7 is fitted to the accessory shoe 6, the power source terminals provided in the DC power source light 7 are brought into contact with the power source terminals within the accommodation section 8 so that a power source voltage is applied to the DC power source light 7 from the battery 4. When the power source switch provided in the DC power source light 7 is turned on in this state, the DC power source light 7 emits an illumination light.

Since the battery 4 can also be used as a power source for the DC power source light 7 as described above, it is not necessary to incorporate an exclusive battery in the DC power source light 7 and, therefore, the DC Power source light 7 can be substantially compact and light in weight. Further, since the battery 4 is automatically connected electrically with the DC power source light 7 when the DC power source light 7 is fitted to the accessory shoe, a preparatory work required to make the DC power source light 7 usable becomes simple.

Figure 2:
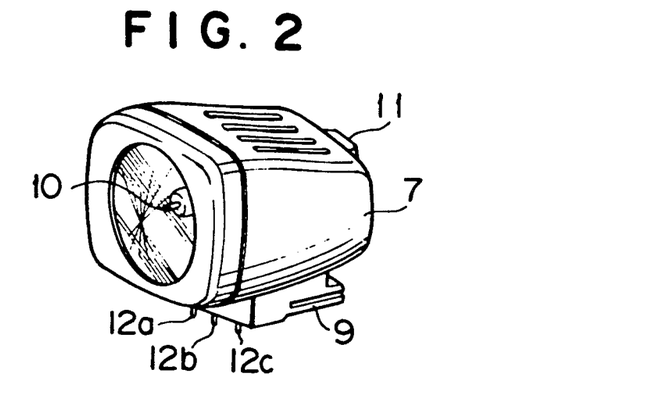
FIG. 2 is an enlarged perspective view of the DC power source light shown in FIG. 1.

FIG. 2 is an expanded perspective view of the DC power source light 7 shown in FIG. 1A, where 9 designate a shoe, 10 a lamp, 11 a power source switch and 12a to 12c power source terminals.

In FIG. 2, the shoe is provided in the DC power source light 7. By fitting the shoe 9 into the accessory shoe 6 of the camera body 1 (FIG. 1B), the DC power source light 7 is fitted to the camera body 1. The power source terminals 12a to 12c are projected near the shoe 9, and these power source terminals 12a to 12c are brought into contact with the power source terminals within the accommodation section 8 shown in FIG. 1B, when the DC power source light 7 is fitted to the accessory shoe 6 of the camera body 1, as described above.

The lamp 10 is used as an illumination unit for emitting an illumination light in the DC power source light 7. When the power source switch 11 provided at the rear surface portion of the DC power source light 7 is turned on in the state shown in FIG. 1A, a power source voltage is applied to the lamp 10 from the battery 4 of the camera body 1 (FIG. 1A) so that the lamp 10 emits an illumination light.

Figure 3A:
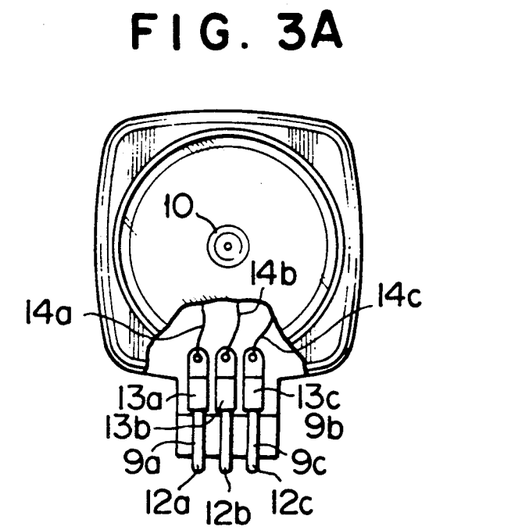
FIG. 3A and FIG. 3B are a front view and a side view respectively of the DC power source light.
Figure 3B:
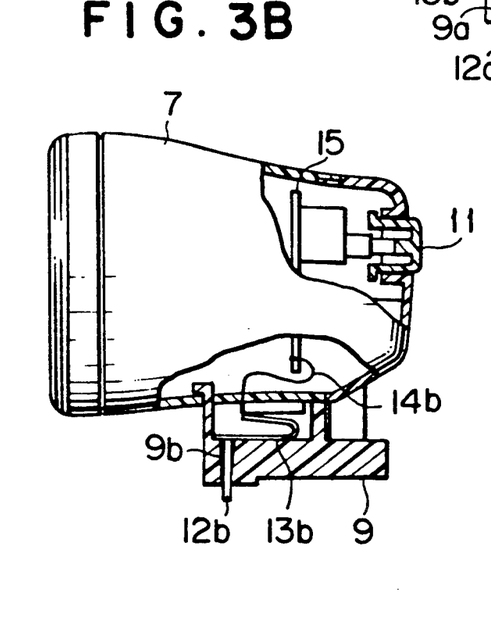

FIG. 3A is a front view showing the inside of a part of the DC power source light 7 shown in FIG. 2 and FIG. 3B is a side view of the same part, where 9a to 9c designate piercing holes, 13a to 13c spring members, 14a to 14c electric wires and 15 a circuit substrate. In FIGS. 3A and 3B, parts corresponding to those in FIG. 2 are referenced with the same symbols.

Referring to FIGS. 3A and 3B, the three piercing holes 9a to 9c are provided at one end of the shoe 9, and the power source terminals 12a to 12c are inserted into these piercing holes 9a to 9c. These power source terminals 12a to 12c are slidable along the piercing holes 9a to 9c.

These power source terminals 12a to 12c are pressed respectively by, for example, the panel-shaped spring members 13a to 13c so that the power source terminals 12a to 12c are projected to the outside from the piercing holes 9a to 9c. These, spring members 13a to 13c are made of conductive materials, and one end of each of these members is connected with the end portion of the inside of the shoe 9 for the power source terminals 12a to 12c, so that the power source terminals 12a to 12c will never go out from the piercing holes 9a to 9c.

The other end of each of the spring members 13a to 13c is connected to a predetermined circuit input terminal not shown on the circuit substrate 15 through each of the electric wires 14a to 14c respectively. A circuit output terminal of this circuit substrate 15 is connected to the lamp 10, and a power source voltage to this lamp is turned on and off by operating the power source switch 11.

Figure 4:
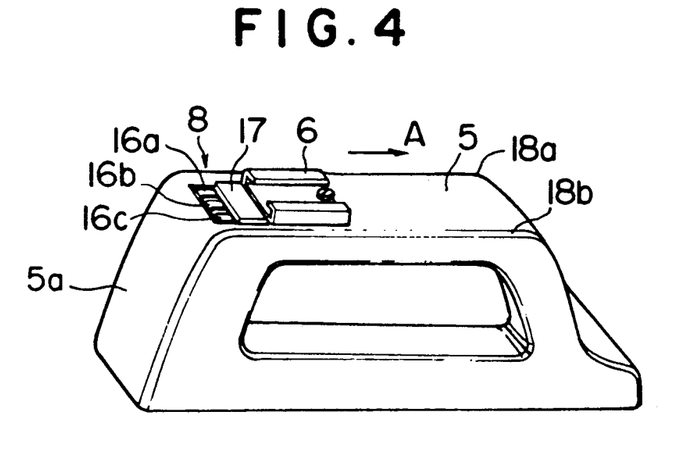
FIG. 4 is an enlarged perspective view of the handle section in FIG. 1.

FIG. 4 is an enlarged perspective view of a portion of the handle 5 on the camera body 1 shown in FIG. 1. In FIG. 4, 16a to 16c designate power source terminals, 17 a lid, and 18a and 18b projections. Portions corresponding to those in FIGS. 1A and 1B are referenced with the same symbols.

Referring to FIG. 4, the accommodation section 8 accommodates the three power source terminals 16a to 16c to which a power source voltage is supplied from the battery 4 (FIG. 1A). The lid 17 is provided to open and close this accommodation section 8. When the DC power source light 7 is not mounted to the camera body 1 as shown in FIG. 1B, the accommodation section 8 is sealed by the lid 17, so that the inside of the accommodation section 8 is not disturbed from the outside when the DC power source light 7 is not necessary, and also characteristic deterioration due to corrosion of the power source terminals 16a to 16c or intrusion of dusts inside the accommodation section 8 can be prevented.

The lid 17 is extended slightly above the upper surface of the handle 5. When the DC power source light 7 is fitted to the accessory shoe 6 on the handle 5 as shown in FIG. 1A, the power source terminals 12a to 12c (FIGS. 2 and 3) of the DC power source light 7 are brought into contact with the front end surface of the lid 17 in the fitting process. As the shoe 9 (FIGS. 2 and 3) of the DC power source light 7 is fitted into the accessory shoe 6, the lid 17 is pushed by the power source terminals 12a to 12c of the DC power source light 7 to slide in the direction of an arrow A.

Then, the lid 17 of the accommodation section 8 is opened and the power source terminals 12a to 12c of the DC power source light 7 are brought into contact with the power source terminals 16a to 16c respectively. In this case, since the power source terminals 12a to 12c are pressed downward by the spring members 13a to 13c respectively as shown in FIGS. 2 and 3, these power source terminals 12a to 12c are pressed respectively by the power source terminals 16a to 16c within the accommodation section 8 shown in FIG. 4. Accordingly, the power source terminals 12a to 12c and the power source terminals 16a to 16c are in contact with each other in a very satisfactory condition.

The end portion of the accommodation section 8 of the handle 5 forms a smooth downward curve. By this arrangement, when the DC power source light 7 is fitted to the accessory shoe 6, the power source terminals 12a to 12c of the DC power source light 7 are first brought into contact with this end portion of the handle 5. At this time, the power source terminals 12a to 12c are pressed upward on the upper surface of the handle 5 against the pressing force of the spring members 13a to 13c (FIGS. 3A and 3B), so that there is no problem in the fitting of the DC power source light 7 to the accessory shoe 6 even if the power source terminals 12a to 12c are projecting downward from the shoe 9 as shown in FIGS. 3A and 3B.

Further, the accessory shoe 6 is provided such that its lower surface is slightly higher than the upper surface of the lid 17, and flanges 18a and 18b slightly higher than the upper surface of the lid 17 are provided on the upper surface of the handle 5 along its both edges. When the DC power source light 7 is fitted to the accessory shoe 6, the lower surface of the shoe 9 of the DC power source light 7 is placed on these flanges 18a and 18b. Since the flanges 18a and 18b are higher than the upper surface of the lid 17, when the DC power source light 7 is slided with the shoe 9 loaded on the flanges 18a and 18b, the shoe 9 of the DC power source light 7 is automatically engaged with the accessory shoe 6.

As described above, the lid 17 is securely opened and closed by the power source terminals 12a to 12c of the DC power source light 7, and the shoe 9 of the DC power source light 7 is smoothly engaged with the accessory shoe 6 on the handle 5 in a simple operation.

Figure 5:
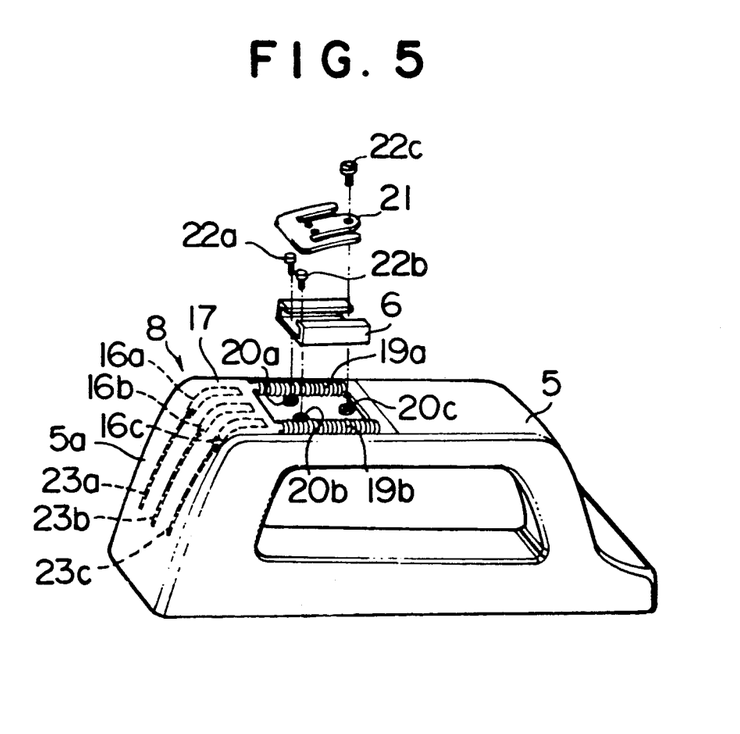
FIG. 5 is a drawing showing the breakdown of the structure of the main portion of the handle section.

FIG. 5 is a perspective view of the breakdown of the accommodation section 8 in FIG. 4, where 5a designates a front side portion of the handle 5, 19a and 19b spring members, 20a to 20c bosses, 21 a spring member, 22a to 22c screws and 23a to 23c electric wires. Parts corresponding to those in FIG. 4 are reference by the same symbols.

Referring to FIG. 5, the lid 17 is pressed by the two spring members 19a and 19b to seal the accommodation section 8 (FIG. 4). The bosses 20a to 20c having three screw holes are disposed between the spring members 19a and 19b, and the accessory shoe 6 having the spring member 21 built therein is mounted on the bosses 20a to 20c and is fixed to the bosses 20a to 20c by the screws 22a to 22c which are threaded with the screw holes provided on the bosses 20a to 20c. The spring member 21 is built in the accessory shoe 6 and is fixed to the boss 20c together with the accessory shoe 6 by the screw 22c.

This spring member 21 urges the shoe 9 of the DC power source light 7 to the accessory shoe 6 to avoid loosening of the shoe 9 after it is engaged with the accessory shoe 6.

The power source terminals 16a to 16c are connected to the electric wires 23a to 23c respectively which are wired inside the front side portion 5a of the handle 5, and a power source voltage is applied to the power source terminals 16a to 16c from the battery 4 (FIG. 1A) through these electric wires 23a to 23c.

Figure 6:
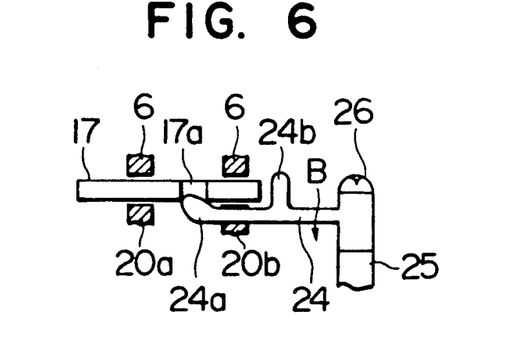
FIG. 6 is a cross section showing the lid locking mechanism of the accommodation section in FIG. 4.

FIG. 6 is a cross section of the accommodation section 8 having a locking mechanism at the lid 17, viewed from the side of the front side portion 5a, where 17a designates a lock hole, 24 a lock piece, 24a a lock section, 24b a plunge, 25 a boss and 26 a screw. Portions corresponding to those in FIGS. 4 and 5 are reference with the same symbols.

In FIG. 6, the boss 25 having a screw hole is provided on the upper surface of the handle 5 (FIG. 5), and the lock piece 24 is fixed to the boss 25 by the screw 26. The lock piece 24 has a lock section 24a of which front section is curved upward, and a plunge 24b having an upward projection is provided between the lock section 24a and a fitting portion to the boss 25. The lock piece 24 has elasticity such that it is bent up and down (in the arrow direction B) around the fitting portion to the boss 25.

The lid 17 is movable on the upper side of the lock section 24a of the lock piece 24 as explained with reference to FIGS. 4 and 5. The lid 17 has the lock hole 17a, and when the lid 17 is at a position to seal the accommodation as described above, the lock section 24a of the lock piece 24 is engaged with the lock hole 17a.

When the lid 17 has sealed the accommodation section 8 and the lock section 24a of the lock piece 24 is engaged with the lock hole 17a, the lid 17 is in the locked state so that the lid 17 will not open by a mere pushing of the lid 17 in the arrow direction A shown in FIG. 4. In this state, the plunge 24b of the lock piece 24 is projected beyond the plunges 18a and 18b of the handle 5 shown in FIG. 4. When the shoe 9 (FIG. 2) of the DC power source light 7 is mounted on the plunges 18a and 18b, the plunge 24b of the lock piece 24 is pressed downward by the shoe 9 so that the lock piece 24 is deflected in the arrow direction 13 around the fitting portion of the boss 25, as explained with reference to FIG. 4. Therefore, the lock section 24a is disengaged from the lock hole 17a of the lid 17 so that the lid 17 is released from the locking.

As described above, at times other than when the DC power source light 7 is fitted to the accessory shoe 6, the lid 17 can be set in a locked state with the accommodation section 8 in a sealed state, so that the power source terminals 16a to 16c (FIGS. 4 and 5) can be completely protected.

Figure 7:
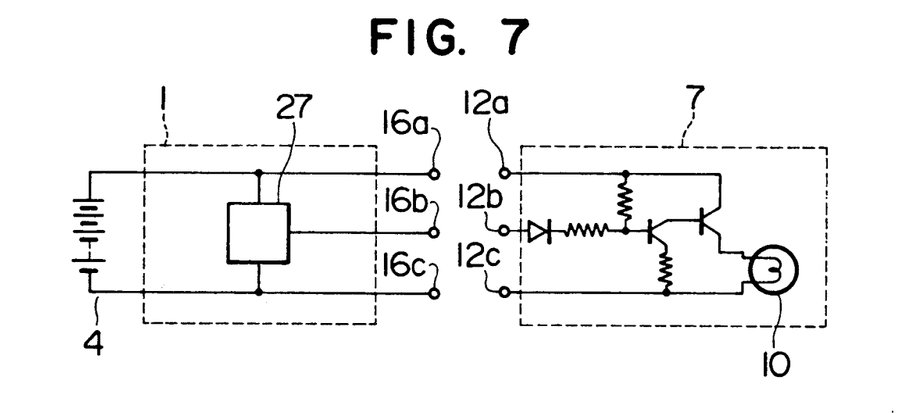
FIG. 7 is a circuit diagram showing one example of the current supply circuit for supplying a current to the lamp in the DC power source light from the camera body of the VTR integrated camera shown in FIG. 1.

FIG. 7 is a circuit diagram showing the current feeding circuit for supplying a current to the DC power source light 7 from the camera body 1 in the VTR integrated camera as explained above with reference to FIG. 7. In FIG. 7, 27 designates a power source control circuit, and portion corresponding to those in the preceding drawings are referenced with the same symbols.

In FIG. 7, an output voltage of the battery 4 is supplied to the power source terminals 16a and 16c at the side of the camera body 1. In this case, the power source terminal 16a designates a $V_{\infty}$ terminal and the power source terminal 16c designates a ground terminal. The power source control circuit 27 comprising a simple switch or a microcomputer and the like is provided in the camera body 1. When the power is supplied to the whole portion of the camera section 2 (FIG. 1A), the power source control circuit 27 detects this state and supplies a high-level control signal to the power source terminal 16b as a control terminal.

When the DC power source light 7 is mounted on the camera body 1 as shown in FIG. 1A, the power source terminals 16a, 16b and 16c are connected respectively to the power source terminals 12a, 12b and 12c, and a power source voltage $V_{\infty}$ is supplied from the battery 4 to the DC power source light 7 through the power source terminals 16a and 12a, and further the DC power source light 7 is grounded through the power source terminals 16c and 12c.

When the whole of the camera section 2 is supplied with power in the above state, the power source control circuit 27 sends a high level control signal to the DC power source light 7 through the power source terminals 16b and 12b. As a result, when the power source switch 11 (FIGS. 2 and 3) in the DC power source light 7 is turned on, the lamp 10 emit light.

By the above arrangement, even if the power source switch 11 is kept in the ON state by keeping the DC power source light 7 mounted on the camera body h, when the power source is turned off in the camera section 2 the supply of a high level control signal from the power source control circuit 27 is stopped so that an unnecessary discharging from the battery 4 can be prevented.

However, in the above arrangement, a power source voltage is always supplied from the battery when an image is picked up by using the DC power source light 7, so that there is a risk that the battery 4 is deteriorated because of its excess discharging.

Figure 8:
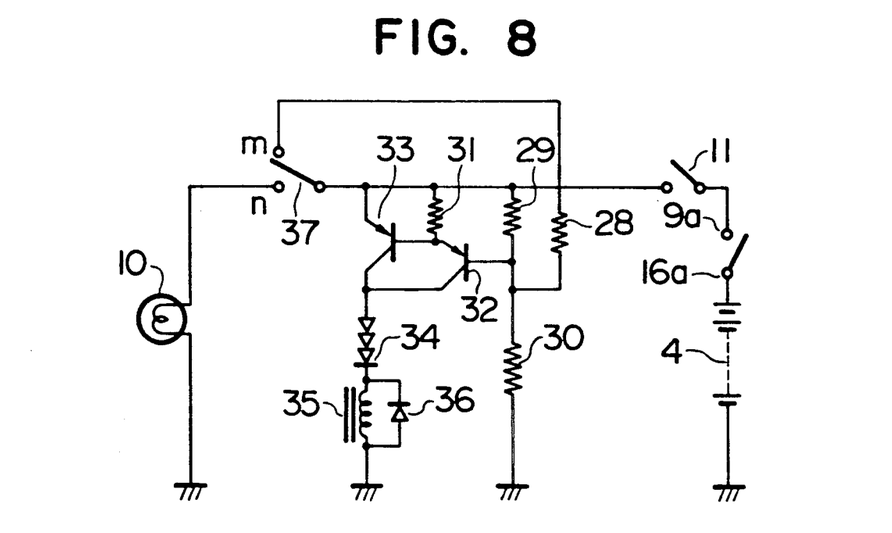
FIG. 8 is a circuit diagram showing one example of the battery excess discharge prevention unit used in the embodiment shown in FIG. 1.

FIG. 8 is a circuit diagram showing one example of the battery excess discharge prevention unit for use in the video camera according to the present invention. In FIG. 8, 28 to 31 designate resistors, 32 and 33 PNP-type transistors, 34 a diode, 35 a relay coil, 36 a diode and 37 a change-over switch. Portions corresponding to those in the preceding drawings are referenced by the same symbols.

In FIG. 8, when the power source terminals 9a and 16a are not connected with each other, or when the power source switch 11 is in the OFF state even if these power source terminals are connected (that is, even if the DC power source light 7 is integrated with the camera body 1), no current flows to the relay coil 35 and the changeover switch 37 is closed to the m side.

Next, when the power source switch 11 is turned on in the state that the power source terminals 9a and 16a are connected with each other, a power source voltage from the battery 4 is divided by a voltage dividing circuit comprising resistors 28 to 30 through the power source terminals 16a and 9a and the power source switch 11, and the divided voltage is supplied to the base of the transistor 32 which forms a Darlington connection circuit together with the transistor 33.

When the potential difference between the emitter of the transistor 33 and the base of the transistor 32 of the Darlington connection circuit (that is, the potential difference between the emitter and the base of the Darlington connection circuit) is equal to or greater than a prescribed value, the transistors 32 and 33 are turned on and a current flows to the relay coil 35 so that the change-over switch 37 is closed to the n side. By this arrangement, a power source voltage is supplied to the lamp 10 from the battery 4 through the power source terminals 16a and 9a, the power source switch 11 and the make and break switch 37 so that the lamp 10 is turned on.

In this case, the power source voltage from the battery 4 is divided by the resistors 29 and 30 and the divided voltage is applied to the base of the transistor 32. Since the potential difference between the emitter and the base of the Darlington connection circuit at this time is larger than the potential difference of the case when the above-described make and break switch is closed to the m side and the resistor 28 is connected in parallel with the resistor 29, the change-over switch 37 is held in the state that it is closed to the n side and the lamp 10 is kept in the ON state.

When the power of the battery 4 is connected as a result of a continuous use of the DC power source light 7 and the like, the power source voltage decreases. When the power source voltage continues to decrease in the state that the change-over switch 37 is closed to the n side, the potential difference between the emitter and the base of the Darlington connection circuit becomes smaller. When the potential difference becomes smaller than the above-described prescribed value, the transistors 32 and 33 are turned off and no current flows to the relay coil 35, so that the change-over switch 37 is turned to the m side and the lamp 10 stops lighting. At the time, since the resistor 28 is connected in parallel with the resistor 29, the base potential of the transistor 32 becomes higher and the potential difference between the emitter and the base of the Darlington connection circuit becomes further smaller so that the change-over switch 37 is held at the m side.

When the power source voltage is reduced by excess discharging of the battery 4 as described above, current supply to the lamp 10 is automatically inhibited. Resistance values of the resistors 28 to 30 are set at very high levels to prevent a flow of current at the battery 4 when the change-over switch 37 is closed to the m side. Accordingly, even if a large imbalance occurs in the state of charge between the cells of the battery 4 due to excess discharging, no charging occurs between the cells so that the battery can be prevented from being deteriorated.

After the change-over switch 37 is switched to the m side by the reduction of a power source voltage due to discharging of the battery 4, the battery 4 does not produce a power source voltage of which potential difference between the emitter and the base of the Darlington connection circuit exceeds the above-described prescribed value in the state that the resistor 28 is connected in parallel with the resistor 29, even if the battery 4 is charged. Therefore, the transistors 32 and 33 are not turned on and the change-over switch 37 is not switched to the n side so that the lamp 10 is not turned on. As a result, the excess discharge prevention unit has hysteresis characteristics as shown in FIG. 9.

Figure 9:
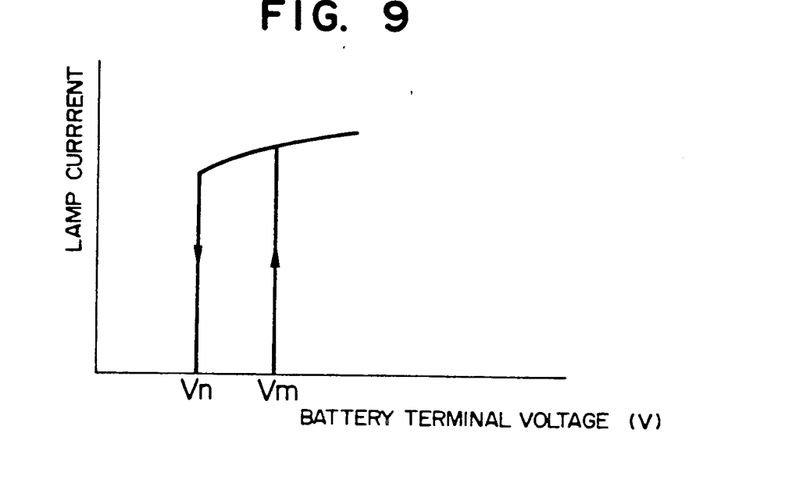
FIG. 9 is a characteristic diagram of the battery excess discharge prevention unit shown in FIG. 8.

Assume $V_n$ represents a voltage value of a source voltage (battery terminal voltage) when the potential difference between the emitted and the base of the Darlington connection circuit is the above-described prescribed value when the change-over switch 37 is closed to the n side in FIG. 9 and also assume that $V_m$ represents a voltage value when the change-over switch 37 is closed to the m side. Then, there is a relation of $V_n < V_m$ and when the power source voltage is lower than $V_n$ in the state that the change-over switch 37 is closed to the n side, the change-over switch 37 is switched to the m side and a current flowing to the lamp 10 becomes zero. When the power source voltage becomes equal to or higher than $V_m$ in the state that the change-over switch is closed to the m side, the change-over switch 37 remains closed to the m side and the lamp 10 is not turned on.

According to the above-described hysteresis characteristics, the following effect is also obtained.

Assume that the resistor 28 is not provided and there is no hysteresis characteristic. Then, when the power source voltage from the battery 4 becomes such that the potential difference between the emitter and the base of the Darlington connection circuit takes a value which is almost equal to the above-described prescribed value, there is a case that the transistors 32 and 33 are turned on and off repeatedly due to a very small variation of this power source voltage and the like. In this case, current conduction and non-conduction are alternately repeated in the relay coil 35 and a chattering occurs in the make and break switch 37 so that the lamp 10 is turned on and off.

Further, the output voltage of the battery is lowered with an increase in the battery temperature. However, when the battery temperature is lowered the output voltage increases to return to the original state.

In the case where the resistor 28 is eliminated from the state shown in FIG. 8 and there is no such hysteresis characteristic as shown in FIG. 9, a continuous lighting of the lamp 10 causes a temperature of the battery 4 to noise due to a current continuously flowing to the battery 4 and the output voltage (power source voltage) is lowered. When the potential difference between the emitter and the base of the Darlington connection circuit becomes smaller than the above-described prescribed value due to the reduction in the output voltage of the battery 4, the transistors 32 and 33 are turned off and the switch 37 becomes in the OFF state so that no current is supplied to the lamp 10. In this case, since the resistance values of the resistors 29 and 30 are set at very high levels, no current flows to the battery 4 so that the temperature of the battery 4 is lowered. As a result, the output voltage of the battery 4 drops and its output voltage increases. When the potential difference between the emitter and the base of the Darlington connection circuit becomes larger than the above-described prescribed value, the transistors 32 and 33 are turned on again and the switch 37 is closed so that a current is supplied to the lamp 10.

Based on the above operation, even if the transistors 32 and 33 are in the OFF state due to a rise in the battery temperature, a subsequent drop in the battery temperature will immediately turn on the transistors 32 and 33 so that a chattering occurs in the switch 37. Therefore, the battery 4 is kept in the state that its temperature is high and accordingly its performance is deteriorated to reduce the life of the battery 4.

When, on the other hand, the resistor 28 is provided to have hysteresis characteristics as shown in FIG. 9, the power source voltage produced from the battery 4 becomes lower than the voltage value $V_n$ shown in FIG. 9 and the transistors 32 and 33 are turned off to prohibit supply of a current to the lamp 10. As a result, unless this power source voltage becomes equal to or greater than the voltage value $V_m$ which is larger than the voltage value $V_n$ by a predetermined value, the transistors 32 and 33 are not turned on. Therefore, even if the power source voltage becomes almost equal to the voltage value $V_n$ and fluctuates, no chattering occurs in the change-over switch 37 by suitably setting the difference of the two voltage values $(V_m - V_n)$.

Further, when the transistors 32 and 33 are turned off by an increase in the temperature of the battery 4, the transistors 32 and 33 are not turned or unless this temperature becomes sufficiently lower to make the power source voltage from the battery 4 sufficiently high. Accordingly, it is also possible to prevent a rise in the temperature of the battery 4.

In general, a battery is structured by many cells, and each one of the cells is operated normally at 1.2 V. It is general to consider that when a voltage of each cell has dropped by 1 V or more the battery is in the excess discharge state. Accordingly, when it is assumed that the battery 4 in FIG. 8 comprises eight cells, a voltage of 9.6 V can be obtained from this battery 4. In this case, in order to prevent excess discharge of the battery 4, it is desirable that the voltage value $V_n$ of the power source voltage when the transistors 32 and 33 are turned off is set at $9.6 - \{(1.2 - 1.0) \times 8\} = 8$ V. This is, however, a mere one example.

Figure 10:
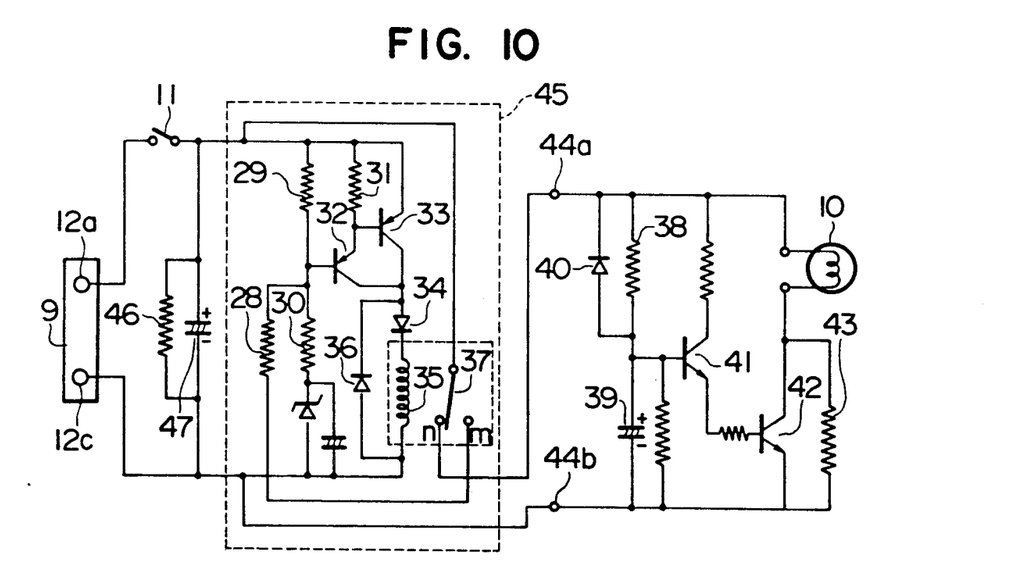
FIG. 10 is a circuit diagram showing one example of the excess current prevention unit used in the embodiment shown in FIG. 1.

FIG. 10 is a circuit diagram showing one example of the excess current prevention unit which is used in the video camera according to the present invention. In the drawing, 38 designates a resistor, 39 a capacitor, 40 a diode, 41 and 42 NPN - type transistors, 43 a resistor, 44a and 44b terminals, and 45 a battery excess discharge prevention unit shown in FIG. 8. Portions correspond to those in the preceding drawings are referenced with the same symbols.

In FIG. 10, when the shoe 9 is mounted on the camera body 1 as illustrated in FIG. 1, the capacitor 39 is in the completely discharge state, the transistors 41 and 42 are in the OFF state and the lamp 10 and the resistor 43 are connected in series between the terminals 44a and 44b, as an initial state.

In the initial state as described above, when the power source switch 11 is turned on and the make and break switch 37 is closed to the n side as shown in FIG. 8, a power source voltage is supplied between the terminals 44a and 44b from the power source terminals 12a and 12c through the battery excess discharge prevention unit 45.

As a result, a current flows to the lamp 10 so that the lamp 10 is turned on. However, there is a limit to the size of the current flowing to the lamp 10 due to the resistor 43 connected in series with the lamp 10. Accordingly, when the power source switch 11 is turned on and the lamp 10 starts lighting, the size of the current flowing from the battery 4 is limited so that excess current can be prevented. It is also possible to prevent deterioration of the performance of the battery 4 and occurrence of power source noises from other connected units to which a power source voltage is applied from the battery 4.

On the other hand, when a power source voltage is started to be applied between the terminals 44a and 44b, the capacitor 39 is charged in accordance with a time constant determined by the resistor 38 and the capacitor 39. The charged voltage of the capacitor 39 is applied to the base of the transistor 41. When the potential difference between the base and the emitter of the transistors 41 and 42 becomes equal to or higher than a prescribed voltage due to the charged voltage, the transistors 41 and 42 are turned on.

In this case, the resistance value of the resistor 43 is sufficiently high. Also, the resistance value of the resistor between the collector and the base is almost zero when the transistor 42 is on. Therefore, the resistance value of the resistor 43 is negligible.

When the transistor 42 is turned on, the resistor 43 is short-circuited, so that the power source voltage applied between the terminals 44a and 44b is directly applied to the lamp 10 and a rated value of current flows to the lamp 10 to emit an illumination light of a prescribed amount of light.

Excess current flows during a very short period when the battery excess discharge prevention unit 45 has applied a power source voltage between the terminals 44a and 44b. An occurrence of excess current can be sufficiently prevented even if it is assumed that the period from when the power source voltage is started to be applied to when the transistor 42 is turned on is about 0.2 to 0.3 second. Further, since this period is very short such as 0.2 to 0.3 second and since the lamp 10 is started to be lighted during this period, the small amount of light emitted from the lamp 10 by the resistor 43 during this period is negligible in the actual situation and this causes no trouble in the use of the DC power source light.

Referring to FIG. 10, the capacitor 39 is used for momentarily and sufficiently discharging the capacitor 39 through the lamp 10 and the transistor 42 when the power source switch 11 has been turned off to turn off the light of the lamp 10. When the power source switch 11 is turned on and a power source terminal is started to be applied between the terminals 44a and 44b, the capacitor 39 starts charging always in the same condition.

A time length from when the power source voltage is started to be applied till when the transistor 42 is turned on between always a constant value including an excess current generation period.

In FIG. 10, the circuit comprising the resistor 46 and the capacitor 47 absorbs a noise generated when the power source switch is turned on and off, and this noise is not sent to the battery.

In FIGS. 8 and 10, the control signal as explained with reference to FIG. 7 is not necessary. Accordingly, two power source terminals are sufficient in the DC power source light 7 is FIG. 3 and the accommodation section 8 in FIG. 5 respectively.

Although it has been explained that the battery excess discharge prevention unit and the excess current prevention unit shown in FIGS. 8 and 10 are provided in the DC power source light, they may be provided in the camera body instead. However, when these units are provided in the camera body, it is necessary that the power source switch 11 is also provided in the camera body. When the excess current prevention unit is provided in the DC power source light, the power source switch 11 can be provided in the DC power source light if it is disposed in front of the time constant circuit comprising the resistor 38 and the capacitor 39.

As described above, according to the present invention, it is possible to use the battery of the camera body as a power source of the DC power source light, and the DC power source light can be made compact and light in weight. Further, by merely mounting the DC power source light on the camera body, current can be automatically supplied from the battery to the DC power source light, thereby to simplify the preparation work required for using the DC power source light.

Further, according to the present invention, when the battery is in the state of a current supply for a long time because of a long-time use of the DC power source light and an erroneous exposure of the light in the using state for a long time, the excess discharge state of the battery is automatically detected and the current supply to the DC power source light is automatically prohibited. By this arrangement, a state of excess discharge of the battery can be avoided and deterioration of the performance of the battery can be prevented.

Further, according to the present invention, excess current can be restricted when the DC power source light is turned on, so that reduction of the battery life can be prevented and mixing of power source noises into other circuits can be avoided.

We claim:

1. A video camera having an accessory shoe provided in a camera body to fit a shoe section of a DC power source light so that said DC power source light is mountable to and dismountable from said camera body, wherein both said DC power source light and said camera body have power source terminals respectively which are brought into contact with each other when said shoe section of said DC power source light is fitted to the accessory shoe of said camera body, thereby to apply a power source voltage to said DC power source light through said power source terminal from a battery, which is mounted to said camera body, when said DC power source light is mounted on said camera body, wherein said video camera has an accommodation section for accommodating said power source terminals of said camera body and a lid for covering said accommodation section.

2. A video camera according to claim 1, wherein a lid is slidably fitted to said camera body by said spring member, and said DC power source light has a means for moving said lid when said DC power source light is mounted to said camera body.

3. A video camera according to claim 2, wherein said means for moving said lid are said power source terminals of said DC power source light.

4. A video camera according to claim 1, wherein said video camera has a locking mechanism for locking said lid when said DC power source light is not mounted to said camera body.

5. A video camera according to claim 3, further comprising a battery excess discharge prevention unit including a first means for detecting an excess discharge of said battery when the power source voltage from said battery becomes a level not higher than a predetermined first threshold value and a second means for prohibiting an application of a power source voltage to an illumination unit in said DC power source light immediately after said detection of said excess discharge.

6. A video camera according to claim 5, wherein said excess discharge prevention unit further includes a third means which is operated when said second means has prohibited an application of a power source voltage to said illumination unit and which enables an application of a power source voltage has become not lower than a second threshold value which is higher than said first threshold value by a predetermined value.

7. A video camera according to claim 1, further comprising a power source switch provided in sad DC power source light, and an excess current prevention unit including a first means for counting time for a predetermined period after said power source switch has been turned on, a second means for setting to a sufficiently lower level than a rated value a current which flows to an illumination until in said DC power source light during a period while said first means counts time, and a third means for setting to a rated value current which flows to said illumination until after a period when said first means counts time.

8. A video camera comprising a body, a battery mounted to said camera body, a DC power source light which is mountable to and dismountable from said camera body, power source terminals provided in both said camera body and said DC power source light respectively such that this power source terminals are brought into contact with each other when said DC power source light is mounted to said camera body thereby to supply voltage to said DC power source light from said battery, a power source switch provided in said DC power source light, and an excess current prevention unit including a first means for counting time for a predetermined period after said power source switch has been turned on, a second means for setting to a sufficiently lower level than a rated value a current which flows to an illumination unit in said DC power source light during a period while said first means counts time, and a third means for setting to a rated value a current which flows to said illumination until after said first means has counted said predetermined period.

9. A video camera according to claim 8, wherein said excess current prevention unit is provided within said DC power source light.

10. A video camera according to claim 8, wherein said excess current prevention unit is provided within said camera body.

11. A video camera according to claim 8, wherein said video camera has an accommodation section for accommodating said power source terminals of said camera body and a lid for covering said accommodation section.

* * * * *